July 4, 1933.     J. H. ROBERTSON ET AL     1,916,533
VARIABLE SPEED FRICTION GEARING
Filed Aug. 20, 1931
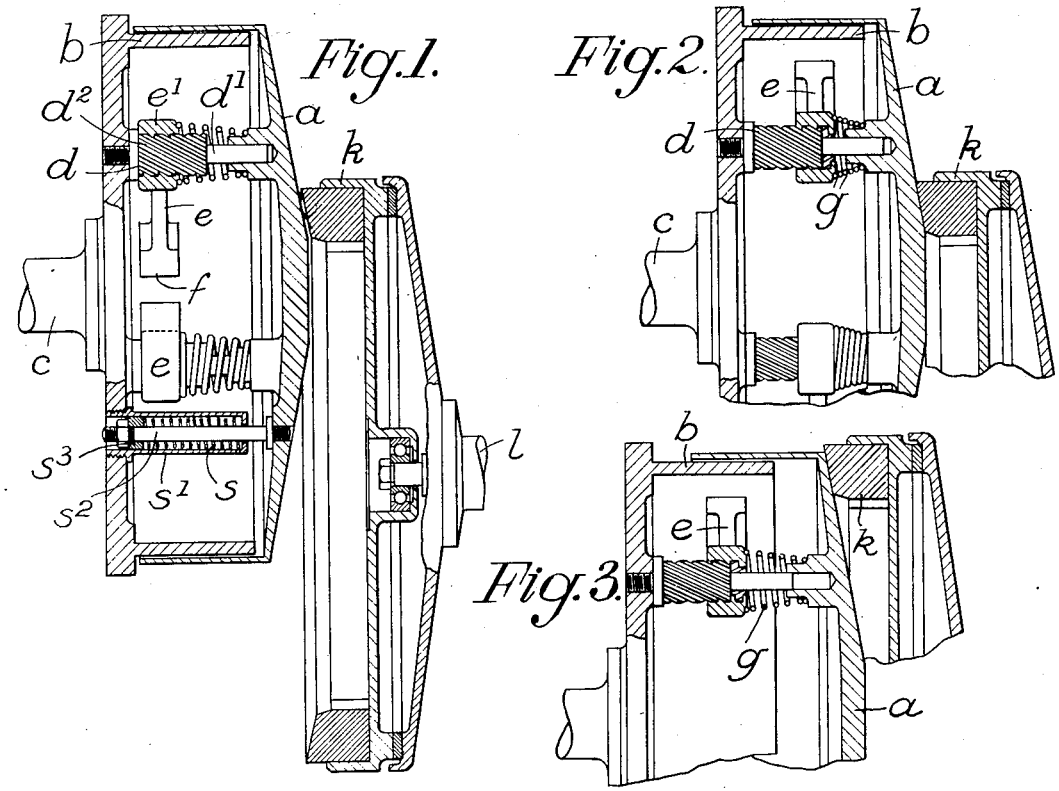
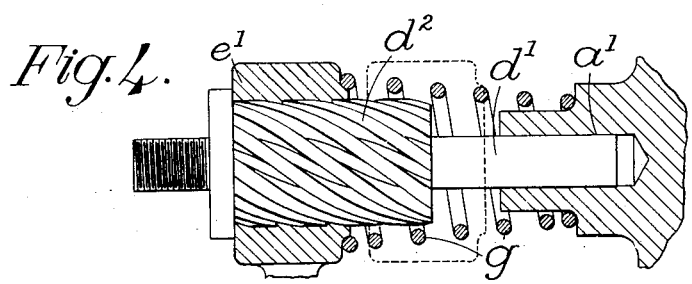
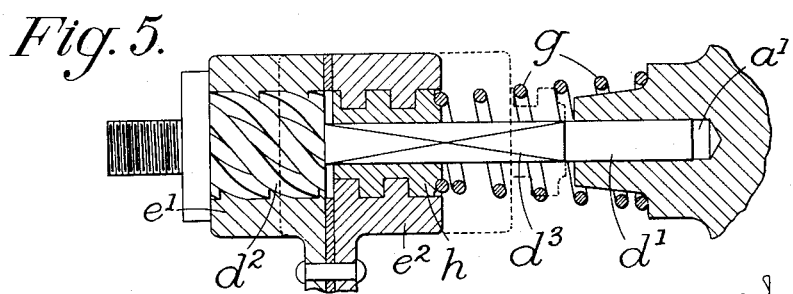

Patented July 4, 1933

1,916,533

UNITED STATES PATENT OFFICE

JOHN HOGG ROBERTSON AND LEONARD GUTTERIDGE, OF LONDON, ENGLAND

VARIABLE SPEED FRICTION GEARING

Application filed August 20, 1931, Serial No. 558,266, and in Great Britain September 12, 1930.

This invention relates to variable speed friction gearing and more particularly to continuously variable friction gearing of the type in which a driven member is adapted to make face contact with a driving member, a direct drive position being provided in which the two members engage coaxially in the manner of a disc or cone clutch, and a series of indirect drive positions being provided in which the driven member is displaced laterally to a variable extent so that contact takes place eccentrically between the conical surfaces of the two members at points (or limited areas) of which the radial distances from the respective axes are unequal.

In friction gearing of this type, it is already known (see U. S. patent specification No. 1,772,593) to render the driving member displaceable axially to maintain the driving contact during lateral displacement of the driven member, for example automatically in accordance with its speed by means of a governor device.

In applying a speed-responsive control by a centrifugal governor directly to the axial displacement of a driving member having a wide range of speed, as in the case of motor car engines, the pressure set up between the driving and driven members, if sufficient at the lower speeds of rotation, becomes altogether excessive at the higher speeds; this excessive pressure is objectionable not only as introducing unnecessary loading upon the parts and thrust bearings, but also as making the governor control the dominant factor in determining the gear ratio to the prejudice or exclusion of the other automatic or manual controls. Moreover the engaging pressure between the members to transmit a given torque in the direct drive position needs not to be so great as in the lower gear positions, whereas the centrifugal governor provides greater pressure in the direct drive position when rotating at higher speed than in the lower gear positions obtained when it is rotating comparatively slowly.

The present invention has for its object to provide an improved form of governor mechanism, which furnishes the necessary pressure for the axial displacement in accordance with speed, but limits the pressure to a definite maximum.

According to this invention, the centrifugal mass or masses of the governor mechanism is or are so arranged as to have a limited movement which is completed within a selected increase of speed, and to transmit the movement to the axially displaceable member by means of yielding connections which become fully loaded at the completion of the centrifugal mass movement.

The invention is hereafter described with reference to the accompanying drawing, in which:—

Figure 1 is a longitudinal section of the driving and driven members of a variable friction gearing of the type mentioned above, the parts being in the position of rest or of the "idling" speed, and the gear members out of engagement.

Figure 2 is a partial view with the parts in the position corresponding to a higher speed and the gear members engaged in the low gear position.

Figure 3 is a similar view with the parts in the high speed position and the gear members engaged in the direct drive position.

Figures 4 and 5 are details of two forms of screw and nut connections for producing the compression of the springs controlling the sliding member of the gearing.

Referring to Figures 1 to 3, the invention is shown applied to a governor-controlled driving member in the form of a coned disc $a$ slidable axially upon the exterior of a cylindrical box or casing $b$ mounted in place of or in addition to the flywheel upon an engine shaft $c$ or other driving shaft, and adapted to engage a driven member $k$ which is displaceable laterally in relation to the axis of the driving member, for transmitting power to the driven shaft $l$ at variable speed.

From the rear wall of the casing $b$ there project into the interior a number of evenly spaced parallel studs $d$ on which are pivotally mounted a like number of lever arms $e$ carrying at their free ends the governor weights $f$, which are so arranged as to produce similar part-rotary movements of the lever arms $e$ under the action of centrifugal force; the outward movement of the weights is limited by their engagement with adjustable or other stops, for example with the periphery of the casing $b$. Diametrically opposite to the stud $d$, supporting the lever arm $e$, there is shown a control device comprising a spring $s$ enclosed in a thimble $s^1$ screwed into the rear wall of the casing, a rod $s^2$ screwed into the disc $a$ carrying a block $s^3$ upon which the spring presses in order to hold the disc $a$ in the retracted position.

The front ends $d^1$ of the studs $d$ enter corresponding socket holes $a^1$ in the back of the slidable cover which forms the coned driving disc $a$. Between the pivotal bosses $e^1$ of the governor arms and the back of the slidable cover, coiled springs $g$ are mounted around the studs $d$, these springs tending when compressed to push the slidable cover $a$ axially forward from the casing $b$ against the action of the springs $s$. The compression of the springs $g$ is produced by the outward part-rotary movement of the governor arms under the action of centrifugal force, for example by quick-pitch screw and nut connections, helical cam faces or the like means for converting rotary movement into longitudinal movement. As shown more clearly in Figure 4, the bosses $e^1$ of the lever arms may be formed as nuts engaged upon screw-threaded portion $d^2$ of the studs; alternatively there may be employed separate screw-threaded bushes or sleeves engaging the screwed bosses of the lever arms and slidable without rotation upon the studs.

Figure 5 illustrates the combination of screw bosses $e^1$ engaged upon screw-threaded portions $d^2$ of the studs, with screwed bosses $e^2$ upon other lever arms secured beside the first $e$, these bosses $e^2$ engaging screw-threaded bushes or sleeves $h$ slidable without rotation upon squared portions $d^3$ of the studs; the two screwed connections are made right and left hand respectively, so that the bushes $h$ serving to compress the springs $g$ have approximately twice the axial movement of the lever bosses $e^1$ $e^2$.

In the construction according to Figures 1 to 4, the coiled compression springs $g$, which constitute the yielding connections for transmitting the limited movement of the levers $e$ produced by the governor weights to the axially displaceable coned disc $a$, may have their ends fixed to the lever bosses $e^1$ and to the slidable cover $a$ respectively, so as to control the lever arms $e$ by torsional effect in addition to their compression.

In the position of rest, or when the casing $b$ is revolving at low speed, the lever arms are retained in their inmost position by the action of the control springs $s$, or by the torsional action of the springs $g$ as mentioned above. The driving disc $a$ therefore remains out of contact with the driven member $k$ of the gearing, giving a free position (Figure 1).

When the speed increases to or above the selected minimum value and the driven member $k$ still occupies the lowest gear position (Figure 2), the loading of the yielding connection springs $g$ due to the outward movement of the governor masses $f$ will then be sufficient to transmit the drive substantially without slip. As the gear ratio is raised, by lateral displacement of the driven member $k$, the axial displacement of the driving member $a$ as it approaches the direct drive position (Figure 3) will correspondingly relieve the yielding connections $g$ so as to reduce the engaging pressure between the frictional members $a$ $k$ until in the direct drive position the required minimum pressure is exerted. So long as the speed remains at or above the value corresponding to the extreme outer position of the levers $e$, the variation of pressure will depend solely upon the position of the laterally displaceable member $k$; but if the speed falls below this value, then the relief of the yielding connections $g$ due to the partial return movement inwards of the weighted levers $e$ will allow the other controlling factor or factors to operate for lowering the gear ratio, the consequent lateral displacement of the driven member $k$ forcing the disc $a$ inwards and reacting upon the yielding connections $g$ so as to restore the engaging pressure substantially to that required for transmitting the torque under the new conditions.

The springs and weights are so designed and arranged that the full outward movement of the lever arms is produced at a relatively low speed, for example twice or three times the "idling" speed of the engine, the arms or weights being then in engagement with their stops so that no further increase of the spring pressure upon the slidable disc $a$ can occur even at the highest speeds possible.

What we claim is:—

1. In variable speed friction gearing comprising a rotary driving member having a part-conical face, and a driven member adapted to make face contact with said driving member in positions of varying relative eccentricity, the combination of a centrifugal governor rotating with said driving member, and yielding spring means for exerting pressure upon said driving member to cause its axial displacement into engagement with said driven member, said yielding spring means compressed by operation of said centrifugal governor and pressing directly against said driving member.

2. In variable speed friction gearing comprising a rotary driving member having a part-conical face, and a driven member adapted to make face contact with said driving member in positions of varying eccentricity in relation to said driving member, the combination of a governor lever, a pivotal support for said lever, said support rotating with said driving member, yielding spring means for exerting pressure upon said driving member to cause its axial displacement into engagement with said driven member, and means for compressing said yielding spring means by pivotal movement of said lever, said compressing means including a helical connection for converting rotary movement into longitudinal movement.

3. In variable speed friction gearing comprising a rotary driving member having a part-conical face, and a driven member adapted to make face contact with said driving member in positions of varying eccentricity in relation to said driving member, the combination of a governor lever, a pivotal support for said lever, said support rotating with said driving member, yielding means for exerting pressure upon said driving member to cause its axial displacement into engagement with said driven member, a screw connection for operating said yielding means by pivotal movement of said lever, and means for returning said lever.

4. In variable speed friction gearing comprising a rotary driving member having a part-conical face, and a driven member adapted to make face contact with said driving member in positions of varying eccentricity in relation to said driving member, the combination of a governor lever having a screw-threaded boss, a screw-threaded support for said lever, said support rotating with said driving member, and a compression spring engaged between said screw-threaded boss and said driving member, the rotation of said lever upon said support due to centrifugal action causing said boss to travel along said support, and the longitudinal movement of said boss producing compression of said spring to exert yielding pressure upon said driving member for its engagement with said driven member.

In testimony whereof we have affixed our signatures.

JOHN HOGG ROBERTSON.
LEONARD GUTTERIDGE.